United States Patent [19]

Hatano et al.

[11] Patent Number: 5,187,017

[45] Date of Patent: Feb. 16, 1993

[54] SLIDING MEMBER, AND METHOD AND APPARATUS FOR PRODUCING THE SAME BY GAS SULPHONITRIDING

[75] Inventors: Kazuyoshi Hatano; Ken Ichiryu, both of Ibaraki; Morio Tamura, Tsuchiura; Eiji Kometani, Abiko; Yasuharu Gotoh, Tsuchiura; Nobuyoshi Hidao, Kashiwa, all of Japan

[73] Assignee: Hitachi Construction Machinery Co., Ltd., Tokyo, Japan

[21] Appl. No.: 722,182

[22] Filed: Jun. 27, 1991

[30] Foreign Application Priority Data

Jul. 5, 1990 [JP] Japan .................................. 2-178437
Mar. 26, 1991 [JP] Japan .................................. 3-086125

[51] Int. Cl.$^5$ .................................................. B32B 9/04
[52] U.S. Cl. ............................................. 428/469; 428/472; 428/472.1; 428/472.2; 428/688; 428/689; 428/697; 428/698; 428/699; 148/318; 148/902
[58] Field of Search ................... 428/469, 472, 472.1, 428/472.2, 688, 689, 697, 698, 699, 704, 161, 639; 148/902, 906, 317, 318, 319

[56] References Cited

U.S. PATENT DOCUMENTS

| | | | |
|---|---|---|---|
| 3,853,602 | 12/1974 | Nakamura | 428/469 |
| 4,273,749 | 6/1981 | Kimura et al. | 423/231 |
| 4,364,995 | 12/1982 | Crawford et al. | 428/697 |
| 4,513,057 | 4/1985 | Peters | 428/699 |
| 4,738,730 | 4/1988 | Ferguson | 148/319 |
| 4,820,591 | 4/1989 | Ramanarayanan | 428/661 |
| 4,944,663 | 7/1990 | Iizuka et al. | 428/472.2 |

FOREIGN PATENT DOCUMENTS

| | | |
|---|---|---|
| 34761 | 9/1981 | European Pat. Off. . |
| 1057237 | 3/1954 | France . |
| 5011107 | 7/1978 | Japan .................. 428/469 |
| 8091166 | 11/1981 | Japan . |
| 0039155 | 8/1983 | Japan . |
| 701685 | 12/1953 | United Kingdom . |
| 1460073 | 12/1976 | United Kingdom . |

OTHER PUBLICATIONS

Chemical Abstracts, vol. 103, No. 2, Jul. 1985, p. 227, col. 103, "Sulfurizing and Nitriding Iron Products with Gas".
Chemical Abstracts, vol. 97, No. 26, Dec. 1982, p. 282, col. 97, "Ferritic, Sulfurizing Thermo-Chemical Treatment".
Chemical Abstracts, vol. 93, No. 14, Oct. 1980, p. 223, col. 93, "Highly Wear-Resistant Sliding Parts".
Chemical Abstracts, vol. 64, 1966, "Sulfatizing and Nitriding of High Speed Steels in $H_2S$ and $NH_3$".

*Primary Examiner*—Ellis P. Robinson
*Assistant Examiner*—Timothy M. Speer
*Attorney, Agent, or Firm*—Fay, Sharpe, Beall, Fagan, Minnich & McKee

[57] ABSTRACT

A sliding member having a layer of $FeS_2$ on its surface is formed by sulphonitriding the member by heatint it at 480° C.–600° C. in the presence of both 10–500 ppm of a hydrogen sulfide gas and 20–70 vol % ammonia gas. An alternate heating method involves performing a primary heat treatment on the sliding member at 450°–540° C. in the presence of 50–200 ppm of a hydrogen sulfite gas and a 10–70 vol % ammonia gas, then ceasing the supply of the ammonia gas, slowly reducing the temperature to between 200°–350° C., and performing a secondary heat treatment at that temperature level.

4 Claims, 10 Drawing Sheets

SLIDING MEMBER, AND METHOD AND APPARATUS FOR PRODUCING THE SAME BY GAS SULPHONITRIDING

BACKGROUND OF THE INVENTION

1. Field of the Invention

This invention relates to a method of modifying and otherwise treating the surfaces of rotating, sliding and rocking members such as pistons, cylinders and valves that are used in hydraulic pumps and motors in construction equipment. More particularly, this invention relates to steel sliding members improved in low-friction property and high wear-resisting (anti-seizure) characteristics, as well as to a process for producing such steel sliding members and an apparatus to be used in implementing said process.

2. Prior Art

While many processes of metal surface treatment have been proposed for improving the wear resistance, fatigue resistance, lubrication and anti-seizure characteristics of steel members, sulphonitriding is especially suited to the purpose of improving the sliding characteristics of metals in a "boundary lubrication region" where the sliding condition is so hostile as to potentially cause a local direct contact of two metal parts if the lubricant film is broken.

Sulphonitriding is commonly performed by a "mixed salt bath" method using neutral or reducing salt baths added with sulfur compounds. However, the cyanides or cyanates in the salt baths are prone to degradation or deterioration at elevated temperatures and it is difficult to maintain a uniform salt bath composition for an extended time. Further, the use of very poisonous cyanides is not desirable from the viewpoint of preventing pollution. The difficulty in controlling the bath concentration makes it difficult to properly treat many types of steel materials. Further, the liquid bath components sometimes fail to reach every portion of the steel member being treated and there is a high possibility that some portions remain untreated.

A gas sulphonitriding process has been proposed with a view to solving the aforementioned problems of the mixed salt bath method. According to gas sulphonitriding, steel members of any complex shapes can be sulphonitrided almost completely and few or no portions of the steel member remain untreated. However, an $\epsilon$-$Fe_{2-3}N$ layer (usually called a "white layer") will form if the surface treatment is conducted by the conventional gas sulphonitriding process. This $\epsilon$-$Fe_{2-3}N$ layer has a hard and brittle mechanical property and has been unable to achieve satisfactory improvements in the wear resistance of steel members.

SUMMARY OF THE INVENTION

The present invention has a principal object of providing a steel sliding member having a novel sulphonitrided film structure.

Another object of the present invention is to provide a novel gas sulphonitriding method that is capable of forming appropriate treated layers on many types of steel members.

A further object of the present invention is to provide an apparatus that can be used in implementing said novel method.

To achieve its principal object, the present invention provides a sliding member that contains Fe as a matrix and which has on the topmost surface a layer chiefly composed of $FeS_2$ that is formed as a result of binding with the matrix Fe. This sliding member is preferably made of steels, with a FeS layer and a $\gamma'$-$Fe_4N$ layer being formed in that order below the $FeS_2$ layer on the topmost surface.

Figure 1:
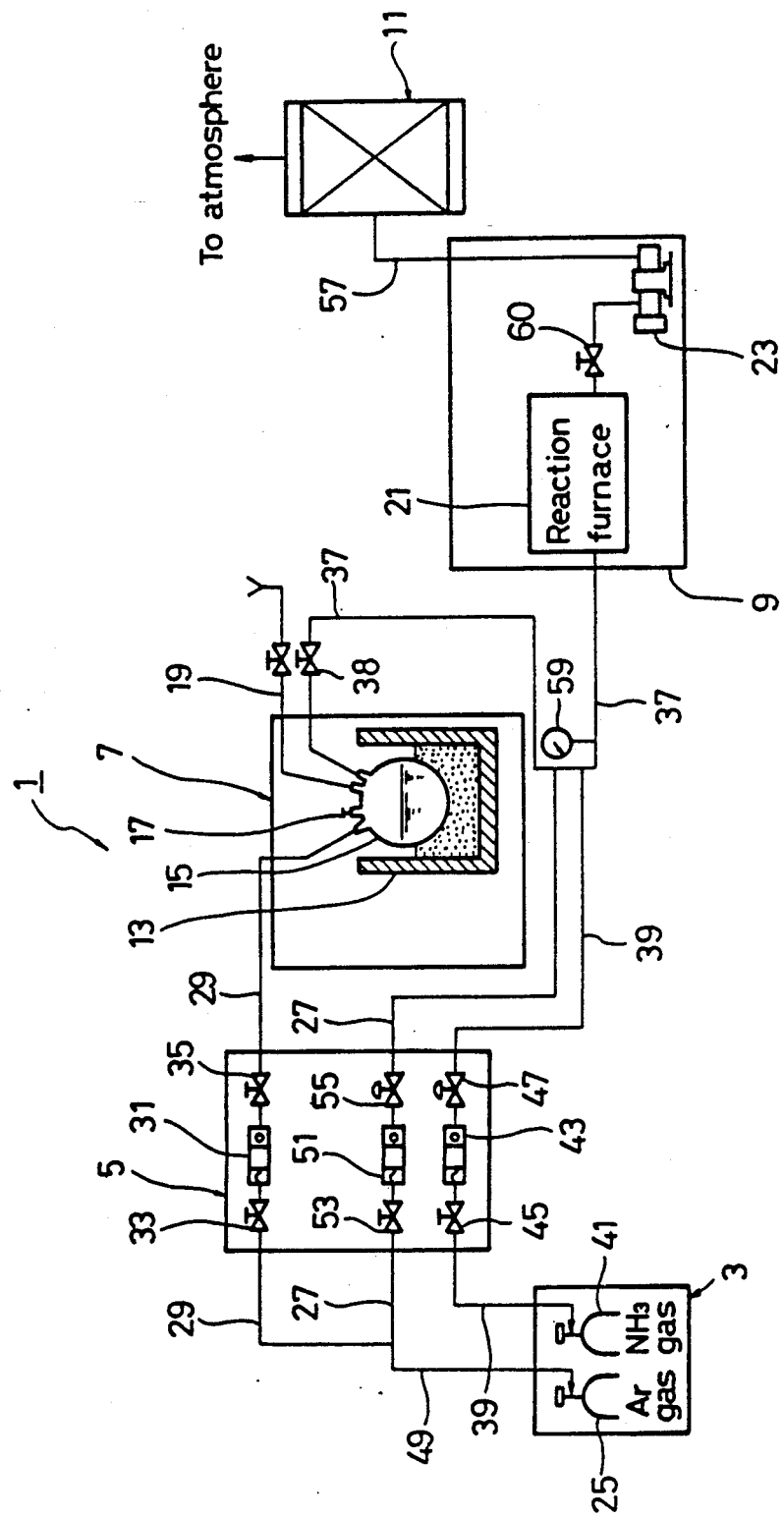
FIG. 1 is a schematic diagram showing a layout for a sulphonitriding apparatus of the type that supplies an in situ generated hydrogen sulfide gas for implementing one version of the gas sulphonitriding method of the present invention.

DETAILED DESCRIPTION OF THE INVENTION:

One method of forming a $FeS_2$ layer on the topmost surface of a steel member consists typically of supplying a reaction furnace containing the steel member with a nitriding and a sulphurizing gas that undergo the thermal dissociation of nitrogen and sulfur, respectively, at 480°–600° C., and heating the steel member to a temperature in that range so that the nascent nitrogen and sulfur created by thermal dissociation will react with the Fe in the surface layer of the steel member.

Stated more specifically, the nitriding gas is an ammonia gas having a concentration within the range of 20–70 vol %, and the sulphurizing gas is a hydrogen sulfide gas which is supplied at a concentration within the range of 10–500 ppm, preferably 100–200 ppm, together with a carrier gas (e.g. nitrogen or argon gas) into the reaction furnace containing the steel member to be treated, followed by a heat treatment at a temperature within the range of 480°–600° C.

When the temperature increases to a certain level, e.g., 300° C., $H_2S$ gas is supplied in a given volume, e.g. 50 ppm, and thereafter, ammonia gas is introduced into the reaction furnace. When a predetermined temperature for the heat treatment has been reached, it is held for a predetermined time. Therefore, the supply of ammonia gas is ceased and only a mixture of hydrogen sulfide and argon gases is kept supplied into the reaction furnace while the steel member is heated in the gradually cooled reaction furnace. Alternatively, when a predetermined temperature for the heat treatment has been reached, hydrogen sulfide gas is introduced into the reaction furnace together with ammonia and argon gases so as to heat treat the steel member.

Another method of forming a $FeS_2$ layer on the topmost surface of a steel member consists typically of supplying a predetermined concentration of a sulphurizing gas together with a predetermined concentration of a nitriding gas and a carrier gas into a reaction furnace containing the steel member to be treated, performing a primary heat treatment at a temperature within the range of 450°–540° C., then ceasing the supply of the nitriding gas, slowly reducing the temperature in the reaction furnace to a level in the range of 200°–350° C., and performing a secondary heat treatment at that temperature. In this method, too, the sulphurizing gas may be admitted into the reaction furnace together with the carrier gas before the nitriding gas is supplied to perform the primary heat treatment.

Stated more specifically, the nitriding gas is an ammonia gas and the sulphurizing gas is a hydrogen sulfide gas which is supplied at a concentration of 50–200 ppm, preferably 100–180 ppm, more preferably 160–170 ppm, most preferably 150 ppm, together with a carrier gas and an ammonia gas at a concentration of 10–70 vol %, preferably 20–50 vol %, most preferably 20 vol %, into the reaction furnace containing the steel member to be treated, and the primary heat treatment is performed at a temperature in the range of 450°–540° C., preferably 480°–530° C., most preferably 500°–520° C. and, after the supply of the ammonia gas is ceased, the reaction furnace is gradually cooled to a temperature in the range of 200°–350° C., preferably 230°–280° C., most preferably to 250° C., at which temperature the secondary heat treatment is conducted.

In either method, a hydrogen sulfide gas may be supplied from a separate container or it may be supplied after in situ generation. For in situ generation, a sulphur-containing inorganic compound selected from the group consisting of metal sulfides and ammonium sulfide may be reacted with a dilute mineral acid having a concentration of 5–30 wt % that is selected from the group consisting of hydrochloric acid, nitric acid, an alcoholic solution of hydrochloric acid, and an aqueous solution of nitric acid.

Either of the two methods described above can be implemented with the gas sulphonitriding apparatus of the present invention which is adapted to supply the sulphurizing and nitriding gases either simultaneously or separately into the reaction furnace. If the sulphurizing gas is first introduced into the reaction furnace together with the carrier gas, with the nitriding gas being subsequently introduced for heat treatment, a sulfide layer will be first formed to retard the diffusion of nitrogen and, as a result, the formation of a nitride layer (in particular, the "white layer") is effectively inhibited, thereby providing a satisfactory result.

The gas sulphonitriding apparatus of the present invention may be adapted to perform only sulphurization on steel members. In a typical method of this sulphurization, a hydrogen sulfide gas is introduced at a concentration within the range of 50–200 ppm, preferably 100–180 ppm, more preferably 160–170 ppm, most preferably at 150 ppm, together with a carrier gas into a reaction furnace containing the steel member to be treated, and the steel member is heat treated at a temperature in the range of 200°–350° C., preferably 230°–280° C., most preferably at 250° C.

The surface of the steel member to be treated is preferably grained to a roughness within the range of 1.0–20 μm by providing straight grooves, crossed grooves, random grooves, dimples or other types of small recesses in the surface of the steel member which is to be treated.

As will be apparent from the foregoing description, the most characteristic feature of the steel sliding member of the present invention is that it has a $FeS_2$ layer on the topmost surface. No such steel sliding members having a $FeS_2$ layer on the topmost surface can be obtained by the prior art sulphonitriding methods. For example, Journal of the Japan Institute of Metals, vol. 51, No. 10, pp. 930–934 (1987) discloses a method in which an iron piece is sulphonitrided with 150 ppm of hydrogen sulfide and 75 vol % ammonia at a temperature of 853K for a time period of 3.6–21.6 ks. An X-ray diffraction analysis of a cross-sectional structure of the sample obtained revealed the presence of FeS on the topmost surface but no $FeS_2$ layer was found to have formed.

Similarly, the sulphonitriding methods disclosed in Unexamined Published Japanese Patent Application Nos. 11107/1980 and 39155/1985 only form a FeS layer on the topmost layer.

Unexamined Published Japanese Patent Application No. 91166/1983 discloses a method of sulphurizing cast iron which comprises immersing a cast iron material in an aqueous solution of nitric acid and thereafter bringing it into contact with a gaseous sulfur vapor atmosphere, thereby forming a sulphurized layer on the surface of said material. According to this method, the surface of the cast iron changes to a sulfide chiefly made of iron sulfides (FeS and $FeS_2$) but in no way will $FeS_2$ alone be formed on the topmost surface. FeS and $FeS_2$ will occur as a mixture and do not form a structure that consists of as clearly separate layers as in the case of the present invention.

If, in the prior art gas sulphonitriding process, a sulphurizing gas (e.g. hydrogen sulfide gas) and a nitriding gas (e.g. ammonia gas) are mixed and supplied simultaneously into a reaction furnace for performing sulphonitriding under heating, a FeS (iron sulfide) layer, an $\epsilon$-Fe$_{2-3}$N layer (usually called a "white layer") and a $\gamma'$-Fe$_4$N layer will form in the cross-sectional structure. However, in gas sulphonitriding which utilizes the simultaneous diffusion of sulfur and nitrogen atoms, the formation of the respective layers is dependent on the diffusion coefficients of N and S atoms in the matrix (e.g. steel). Hence, gas sulphonitriding has a tendency to form preferentially an $\epsilon$-Fe$_{2-3}$N (also called a "white layer") on the surface of the matrix during the nitriding reaction. This $\epsilon$-Fe$_{2-3}$N layer is hard and has a brittle mechanical property. If members having this "white layer" on the topmost surface are used as hydraulic members for construction equipment, particulary in rotating or sliding members such as those of hydraulic pumps or motors where strong impact is exerted, abnormal friction such as seizure or "galling" that would be ascribable to the "shedding off" of the "white layer" occurs during rotation or sliding.

The present inventors conducted extensive research and experimental work for many years in order to solve the aforementioned problems associated with the process of sulphonitriding steel members with ammonia and hydrogen sulfide gases and found that when a hydrogen sulfide gas was introduced at a concentration in the range of 10-500 ppm into a reaction furnace together with a carrier gas, followed by heat treatment at a temperature within the range of 480°-600° C., a FeS$_2$ layer formed on the topmost surface of the member being treated.

The present inventors also found an alternative to this method, in which a primary heat treatment for sulphonitriding with a mixture of sulphurizing and nitriding gases was followed by the supply of only a sulphurizing gas into the reaction furnace to perform a secondary heat treatment for sulphurization for a predetermined time at a temperature of 200°-350° C. which was lower than the temperature adopted in the primary heat treatment. This alternative method enabled thicker and more stable FeS$_2$ layer to be formed on the topmost surface of the matrix.

The exact mechanism behind the sulphonitriding process of the present invention has not been fully unravelled and is still at the stage of speculation. However, it could at least be said that although FeS$_2$ is formed in the primary heat treatment for sulphonitriding, it would be decomposed into FeS and S at 450°-500° C. within the temperature range for the primary heat treatment. In the primary heat treatment, the resulting FeS and S would retard the diffusion of nitrogen atoms, thereby inhibiting the formation of a "white layer". In the cooling process subsequent to the primary heat treatment, FeS$_2$ would be regenerated on the topmost surface of the member being treated. Therefore, by performing the secondary heat treatment for a predetermined time at 200°-350° C. which is lower than the temperature adopted for the primary heat treatment, a FeS$_2$ layer of adequate thickness would be formed.

The layer of FeS crystals forms streaks whereas the layer of FeS$_2$ crystals consists of grains. Therefore, FeS$_2$ has a weaker binding force and provides a better "fit" between mating parts. Further, FeS$_2$ is capable of retaining twice to three times as much lubricant as can be held by FeS. Hence, in the presence of a FeS$_2$ layer on the topmost surface of a sliding member, it can be brought into engagement with the mating part very smoothly without causing any damage.

The sliding member of the present invention has on its topmost surface a FeS$_2$ layer that has a good "fit" and a high capability of retaining lubricants. Below the FeS$_2$ layer is a FeS layer that will readily deform under shear stress. Situated next below is a highly wear-resistant iron nitride ($\gamma'$-Fe$_4$N) layer. With this arrangement, the destruction of lubricant films due to tiny asperities that are created due to working tolerances and/or working processes, in particular, the occurrence of undesired phenomena such as "galling" or seizure that due to contact between projections can be significantly reduced by the inherent nature of the FeS$_2$ layer and the underlying FeS layer. These two layers combine together to provide a synergistic lubricating action that imparts an adequate "fit" to frictional surfaces, whereby excellent tribological characteristics are insured for sliding members of interest.

The first sulphonitriding method of the present invention is preferably performed at a temperature within the range of 480°-600° C. Below 480° C., the desired nitriding reaction will not proceed at a satisfactory rate. Above 600° C., the steel member being treated can potentially undergo thermal deformation. In practice, temperatures up to 600° C. will suffice for commercial sulphonitriding operations.

For implementing the second sulphonitriding method of the present invention, the primary heat treatment for sulphonitriding is performed at a temperature within the range of 450°-540° C. and the secondary heat treatment for sulphurization is performed at a temperature within the range of 200°-350° C. If the temperature for the primary heat treatment exceeds 540° C., a white layer ($\epsilon$-Fe$_{2-3}$N layer) will form preferentially, which is undesirable for the purposes of the present invention. Below 450° C., the nitriding reaction will proceed so slowly that at least 50 hours is necessary to complete the primary heat treatment. If the temperature for the secondary heat treatment is less than 200° C., the formation of a stable FeS$_2$ (marcasite) layer takes too much time to make the process industrially feasible. Beyond 350° C., undesired transformation to instable FeS$_2$ crystals (pyrite) can occur.

After the end of the primary heat treatment for sulphonitriding, the process makes a transition to the secondary heat treatment for sulphurization, with the temperature being lowered from the one adopted for the primary heat treatment to the one suitable for the secondary heat treatment. The rate of temperature lowering is preferably no faster than 50° C./h. If the temperature is lowered at a rate exceeding 50° C./h, the adhesion to the underlying FeS layer will decrease to make it difficult to form a stable FeS$_2$ layer.

The time required to perform the primary heat treatment for sulphonitriding is not in itself critical to the accomplishment of the present invention. The time of the primary heat treatment is variable with factors such as the heating temperature and the concentrations of supplied gases but it is generally within the range of several hours to several tens of hours. If the temperature for the primary heat treatment is 500°-520° C., the heating time usually ranges from 3 to 6 hours and is about 20 hours at the longest.

Similarly, the time required for the secondary heat treatment for sulphurization also is not critical to the accomplishment of the present invention. The time of the secondary heat treatment is generally within the range of several hours to several tens of hours. If the temperature for the secondary heat treatment is 250° C., the heating time is about 3 hours.

The concentration of the hydrogen sulfide gas used in the second gas sulphonitriding method of the present invention is in the range of 50–200 ppm, preferably ca. 100–180 ppm. Because of this low concentration, any leakage of the hydrogen sulfide gas is not likely to cause a serious accident. If the concentration of the hydrogen sulfide gas is less than 50 ppm, a very long time is required to form a satisfactory sulphurized layer. As regards the formation of a sulphurized layer, the best result is obtained when the concentration of the hydrogen sulfide gas is ca. 160–170 ppm. Therefore, even if the hydrogen sulfide gas is used at concentrations higher than 200 ppm, its effectiveness for the formation of a sulphurized layer is already saturated and only diseconomy will result. Further, the potential hazard of a leaking hydrogen sulfide gas will increase. As a matter of fact, it is quite surprising and novel that a satisfactory sulphurized layer can be formed within a short time of gas sulphonitriding using a hydrogen sulfide gas at comparatively low concentrations in the range of ca. 50–200 ppm.

The concentration of the ammonia gas used in the second gas sulphonitriding method of the present invention is in the range of 10–70 vol %. Below 10 vol %, not only is the time of nitriding process prolonged considerably but it is also impossible to form a nitrided layer having adequate hardness. Beyond 70 vol %, more nitrided layer will form than a sulphurized layer and the excessive initial hardness of the treated part not only makes it difficult to achieve smooth engagement with the mating part but also increases the chance of "galling".

In accordance with the present invention, only sulphurization may be performed independently to form a sulfide layer on the surface of a steel member. For example, a sulfide layer may formed on the surface of a member that has already been provided with a nitride layer by another method or, alternatively, only a sulfide layer may be formed on the surface of an untreated matrix. For performing only sulphurization in an independent manner, the process conditions may be the same as those employed for achieving sulphurization in the already-described sulphonitriding process.

The steel members that can be treated by the method of the present invention are iron-based metal members that are subjected to sliding contact in various applications such as machines, apparatus and equipment.

As described in Journal of the Japan Institute of Metals, supra, vol. 51, No. 10, pp. 930–931 (1987), preliminary polishing has been a common practice for steel pieces that need to be surface-treated by the conventional sulphonitriding process. However, according to the study of the present inventors, steel sliding members that were sulphonitrided after surface polishing had only poor wear resistance and that they were found to cause abnormal friction such as "galling" within a short time of sliding.

Under the circumstances, the present inventors grained the surfaces of steel members as workpieces by forming straight grooves, crossed grooves, random grooves, dimples and other kinds of small recesses through appropriate means such machining, etching and laser-assisted processing. In this way, it was insured that the sulphurized layer formed on the surfaces of steel members would not disappear in spite of prolonged frictional sliding, whereby the aforementioned problems of the prior art could be succesfully solved. Grooves can be formed by machining or laser-assisted processing whereas a network of dimples and other kinds of small recesses can generally be formed by etching. The roughness of asperities to be formed on the surfaces of steel members is preferably within the range of 1.0–20 μm. If the surface roughness is less than 1.0 μm, the asperties are not highly effective in anchoring the sulphurized layer onto the surfaces of steel members. If the surface roughness exceeds 20 μm, undesirable phenomena such as seizure will occur on account of a local increase in the planar pressure.

Embodiments of the present invention are described below more specifically with reference to the accompanying drawings.

FIG. 1 is a schematic diagram showing a layout for an apparatus that can be used to implement the gas sulphonitriding method of the present invention. The apparatus shown in FIG. 1 is of the type that supplies a hydrogen sulfide gas as generated on the site. The gas sulphonitriding apparatus generally indicated by 1 consists basically of an Ar and $NH_3$ gas supply unit 3, a gas flow control unit 5, a sulphurizing gas generating unit 7, a sulphonitriding unit 9, and a cleaning unit 11.

A sulphurizing gas such as a hydrogen sulfide gas can be generated in the sulphurizing gas generating unit 7 by carrying out an organic or inorganic chemical reaction in a thermostatic bath 13. A glass reaction vessel 15 is accommodated in the thermostatic bath 13 and charged with a metal sulfide such as iron sulfide or a sulfide such as ammonium sulfide through a closable opening 17. After closing the opening 17, dilute hydrochloric acid, dilute nitric acid, an alcoholic solution of HCl or an alcoholic solution of HNO that have a concentration of 5–30 wt % is charged into the reaction vessel 15 through an addition pipe 19, whereby a hydrogen sulfide gas is generated.

The amount of hydrogen sulfide gas to be evolved can be controlled by various factors including the particle size and amount of the inorganic sulfide to be charged into the reaction vessel, the concentration and amount of dilute mineral acid supplied, and the temperature of the reaction mixture in solution. In order to insure that a hydrogen sulfide gas is evolved in a small amount over a prolonged time, the particle size of the sulfide must be increased whereas the acid concentration and the temperature of the reaction mixture are reduced. Conversely, in order to have a large amount of the hydrogen sulfide gas evolved in a short time, the particle size of the sulfide may be reduced whereas the acid concentration and the temperature of the reaction mixture are increased.

The total amount of hydrogen gas evolved is determined by the amounts of the inorganic sulfide and dilute mineral acid charged into the action vessel. If the amount of hydrogen sulfide necessary to perform sulphurization is already known, the amounts of the inorganic sulfide and dilute mineral acid necessary to evolve that amount of hydrogen sulfides gas can be calculated on a stoichiometric basis. If stoichiometric amounts of the inorganic sulfide and dilute mineral acid are charged into the reaction vessel, no excess hydrogen sulfide gas will evolve and the potential hazard of gas leakage as well as the possible corrosion of equipment by excess gas can be reduced significantly. The amount of hydrogen sulfide gas to be evolved can also be controlled continuously by adjusting the temperature in the thermostatic bath 13. For example, once hydrogen sulfide gas has been evolved for the time necessary to perform sulphonitriding, the amount of evolution of that gas can subsequently be reduced to zero by properly controlling the temperature in the thermostatic bath 13.

A hydrogen sulfide gas can also be generated by an organic chemical reaction. However, for various reasons such as the ease of gas generation, the ease of controlling the amount of gas evolution, and the cost of gas generation, the adoption of an inorganic chemical approach involving the reaction between a metal sulfide and a dilute mineral acid is preferred.

In order to prevent the contamination of the inner surface of the reaction furnace 21, the interior of the furnace 21 is heated to a predetermined temperature in the range of 500°-600° C. while a vacuum is created within the furnace 21 by means of a vacuum pump so that oxygen and other unwanted gases that can contaminate the inner surface of the furnace 21 (i.e., the gases that are evolved from the deposit on the wall of the furnace) are discharged. In a preferred embodiment, an Ar gas is supplied from the unit 25 into the reaction furnace 21 via a pipe 27 and only after a clean atmosphere is created in the furnace 21 by purging with the Ar gas, a workpiece having one of the surface configurations described above is introduced into the furnace for performing the intended sulphonitriding process.

The gas sulphonitriding apparatus depicted in FIG. 1 which is to be used in implementing the method of the present invention is operated in the following manner.

The case of performing sulphurization and nitriding simultaneously in the reaction furnace 21 is first described. The process starts with generating a hydrogen sulfide gas in the reaction vessel 15 in the manner already described above. In order to dilute the generated hydrogen sulfide gas to a given concentration and to transport the diluted hydrogen sulfide gas to the reaction furnace 21, an Ar gas is supplied into the reaction vessel via a pipe 29. A mass flow controller 31 for controlling the flow of Ar gas is provided halfway of the pipe 29. Check valves 33 and 35 are provided ahead of and behind, respectively, the massflow controller 31. By opening or closing these valves, the Ar gas can be supplied into the reaction vessel 15 in a controlled amount. A pipe 37 is connected to the reaction vessel 15 and a valve 38 is provided halfway of said pipe 37. When the Ar gas is supplied into the reaction vessel 15 through the pipe 29, with the valve 38 being opened, the evolved hydrogen sulfide gas collecting in the reaction vessel is carried with the Ar gas to be ejected from the vessel and thence sent at a predetermined concentration to the reaction furnace 21 via the pipe 37.

As NH3 gas supply pipe 39 is connected halfway of the pipe 37. The foremost end of the pipe 39 is connected to an NH3 gas supply source 41. A mass flow controller 43 for controlling the flow of NH3 gas is provided halfway of the pipe 39. Check valves 45 and 47 are provided ahead of and behind, respectively, of the mass flow controller 43. By opening or closing those valves, an NH3 gas can be supplied in a controlled amount.

The pipe 27 through which Ar gas is supplied directly into the reaction furnace 21 is also connected to the hydrogen sulfide gas supply pipe 37. Both pipes 29 and 27 are connected to an Ar gas supply source 25 via a main pipe 49. A mass flow controller 51 for controlling the flow of Ar gas is provided halfway of the pipe 27. Check valves 53 and 55 are provided ahead of and behind, respectively, of the mass flow controller 51. By opening or closing those valves, the Ar gas can be supplied in a controlled amount.

If a valve 60 between a vacuum pump 23 and the reaction furnace 21 is closed whereas all the valves present between the valve 38 and the gas flow adjusting unit 5 are opened, the hydrogen sulfide gas diluted and carried with the Ar gas as supplied through the pipe 37, the NH3 gas as supplied through the pipe 39 and the dilutent and carrier Ar gas as supplied through the pipe 27 combine within the pipe 37 at a point just ahead of the reaction furnace and the mixture of those gases is fed into the reaction furnace 21 to initiate the intended sulphonitriding process. After performing the sulphonitriding for a period, all of the valves in the gas supply system are closed whereas the valve 60 is opened and the vacuum pump 23 is run so that the residual hydrogen sulfide and NH3 gases in the reaction furnace 21 are sent to the cleaning unit 11 via a pipe 57. The cleaning unit 11 is packed with a chemical (e.g. activated carbon) for removing the toxic hydrogen sulfide gas, as well as the noxious NH3 gas. These harmful gases are immobilized by the chemical and their concentrations are reduced to levels permitted by regulations against pollution. The gas rendered intoxic in this way is discharged into the ambient air. Chemicals other than activated carbon that can be used to remove hydrogen sulfide and NH3 gases are well known to one skilled in the art. A pressure gage 59 is preferably provided on the pipe 37 at a point just ahead of the reaction furnace 21.

In the gas sulphonitriding apparatus shown in FIG. 1, the pipe 37 for supplying a hydrogen sulfide gas and the pipe 39 for supplying an NH3 gas are provided separately, so if the valves 45 and 47 in the NH3 gas supply system are closed after sulphonitriding is performed with the mixture of hydrogen sulfide and NH3 gases, only the hydrogen sulfide gas and the carrier Ar gas will be supplied to the reaction furnace 21. This permits only sulphurization to be performed in a selective or secondary manner.

Alternatively, the temperature in the thermostatic bath 13 may be controlled or the valve 38 is closed to cease the supply of the hydrogen sulfide gas permitting only NH3 and Ar gases to be supplied into the reaction furnace. By adopting either method, only the nitriding treatment can be implemented in a selective manner.

An apparatus of the type that supplies a hydrogen sulfide gas as generated in situ may be suitable for small-scale treatment but it sometimes fails to suit the purpose in large-scale operations. Hence, a hydrogen sulfide gas is preferably supplied from a separate container in order to perform sulphonitriding on a large scale. Needless to say, the method of supplying a hydrogen sulfide gas from a separate container is also applicable to small-scale operations.

Figure 2:
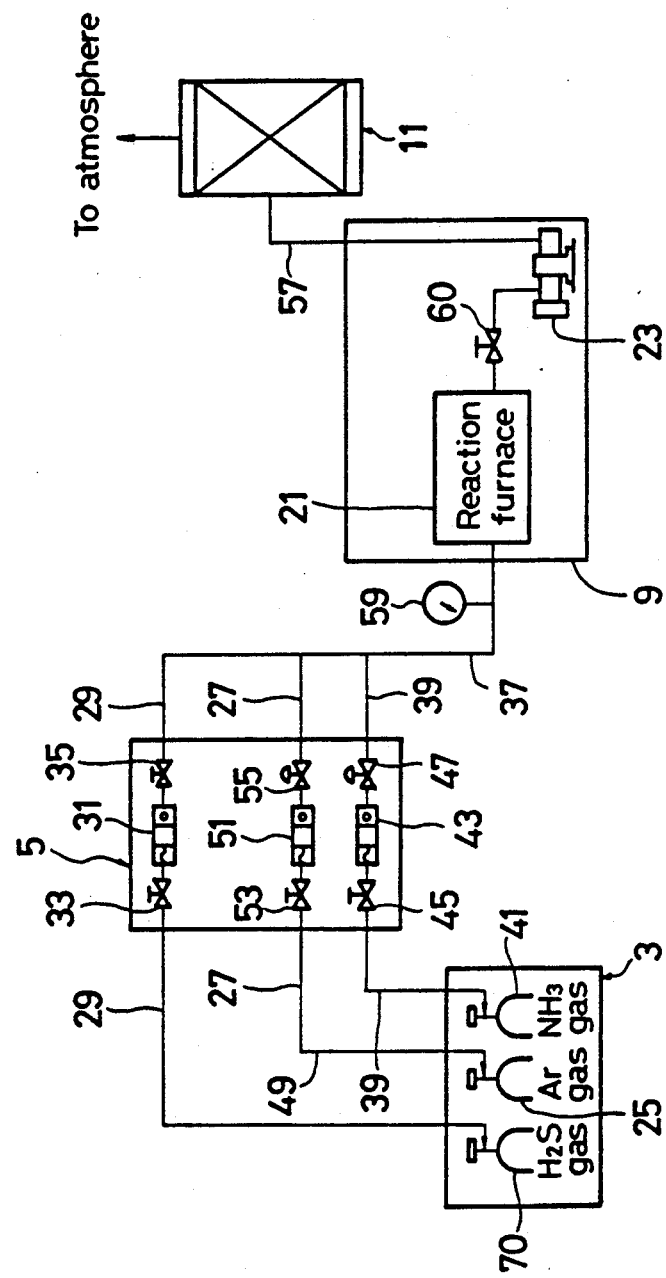
FIG. 2 is a schematic diagram showing a layout for a sulphonitriding apparatus of the type that supplies a hydrogen sulfide gas from a separate container for implementing one version of the gas sulphonitriding method of the present invention.

A sulphonitriding apparatus of the type that supplies a hydrogen sulfide gas from a separate container is depicted in FIG. 2, in which a hydrogen sulfide gas is supplied from a container 70 to the pipe 29 and thence fed into the reaction furnace 21 via the pipe 37. The success of sulphurization in the reaction furnace is in itself not dependent on the method by which the hydrogen sulfide gas is supplied.

The following examples are provided for the purpose of further illustrating the gas sulphonitriding method of the present invention but should in no way be taken as limiting.

EXAMPLE 1

The first gas sulphonitriding method of the present invention was implemented using an apparatus of the type shown in FIG. 1.

The reaction vessel 15 was charged with 50 cc of an alcoholic solution of 5 wt % HCl via the pipe 19. Thereafter, 100 cc of ammonium sulfide was charged into the reaction vessel 15 via the opening 17. The reaction mixture in the reaction vessel was maintained at 298K. in the thermostatic bath 13. The valves 33 and 35 were opened to supply an Ar gas into the reaction vessel 15 at a flow rate of 1.7 cm$^3$/sec. The supply rate of Ar gas can be increased to a higher value, e.g., 3.4 cm$^3$/sec depending upon factors such as the capacity of the reaction furnace 21. Before or during the evolution of a hydrogen sulfide gas, the valves 53 and 55 were opened to supply the Ar gas into the reaction furnace 21 for purging while, at the same time, the temperature in the furnace was raised to 500° C. Thereafter, piston members were set in the furnace. The valves 45 and 47 were opened to supply NH$_3$ gas into the reaction furnace at a flow rate of 100 sccm while, at the same time, the valve 38 was opened to supply a mixture of hydrogen sulfide and Ar gases into the reaction furnace. The concentration of the hydrogen sulfide gas in the mixture was 150 ppm whereas the concentration of the NH$_3$ gas was 20 vol %. With the concentrations of hydrogen sulfide and NH$_3$ gases maintained at those levels, the piston members were sulphonitrided at 500° C. for 6 hours. After the end of the treatment, the heating in the reaction furnace was ceased, all valves were closed and the temperature in the thermoplastic bath was lowered to 263K., whereby the evolution of hydrogen sulfide gas was ceased. Thereafter, the residual hydrogen sulfide and NH$_3$ gases were forced out of the reaction furnace into the cleaning unit 11. After the concentration of the residual H$_2$S gas in the reaction furnace was verified to be lower than a permissible level, the furnace was opened and the treated piston members were recovered.

Figure 3:
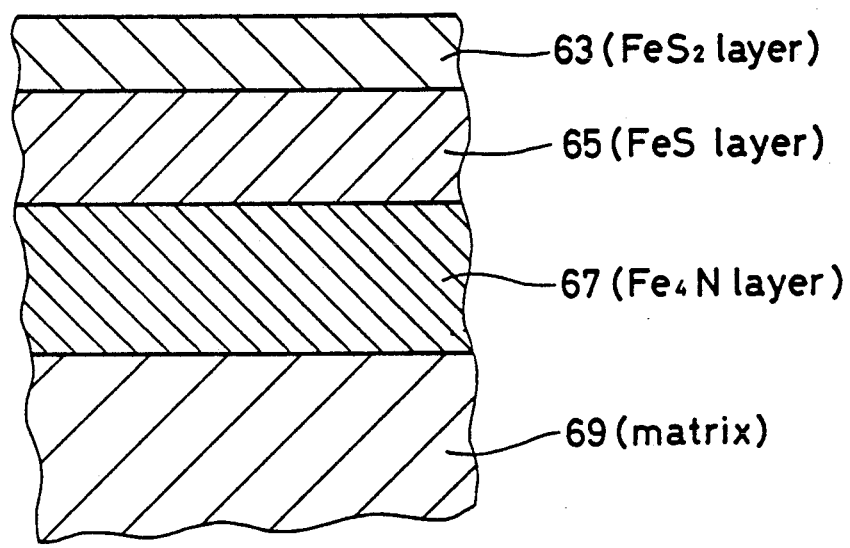
FIG. 3 is a schematic diagram showing a cross-sectional structure of the gas sulphonitrided surface of the member treated in Example 1.

Each of the treated piston members was analyzed for their surface structure by X-ray diffraction and the result is shown schematically in FIG. 3. One can see the following from FIG. 3: a FeS$_2$ (marcasite) layer 63 formed to a depth of ca. 1.0 µm below the topmost surface; lying beneath the FeS$_2$ layer 63 was FeS layer 65 having a thickness of ca. 3-5 µm; lying next below was a γ'-Fe$_4$N layer 67 having a thickness of ca. 100 µm. No white layer (ε-Fe$_{2-3}$N) has formed at all. Indicated by 69 in FIG. 3 is the matrix.

COMPARATIVE EXAMPLE 1

A sulphonitriding treatment was conducted as in Example 1 except that the concentration of H$_2$S gas was reduced to 9 ppm.

Figure 4A:
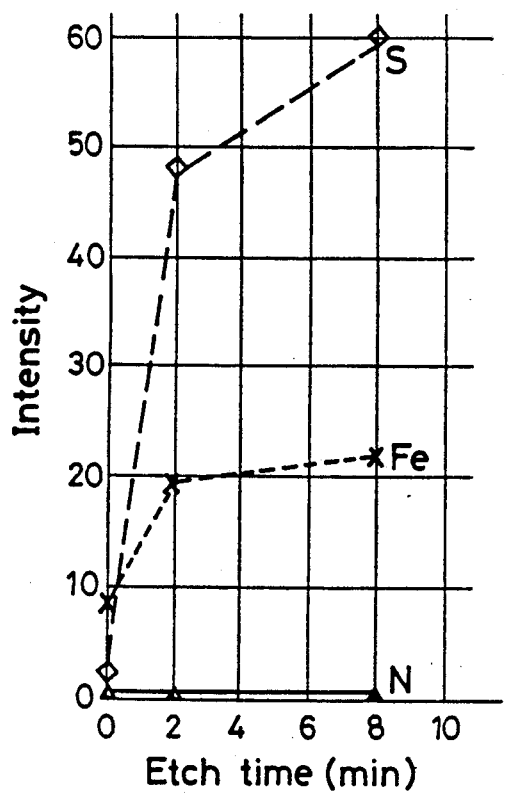
FIG. 4a is a graph showing the result of elemental analysis performed by Auger electron spectroscopy on the gas sulphonitrided surface of the member treated in Example 1.
Figure 4B:
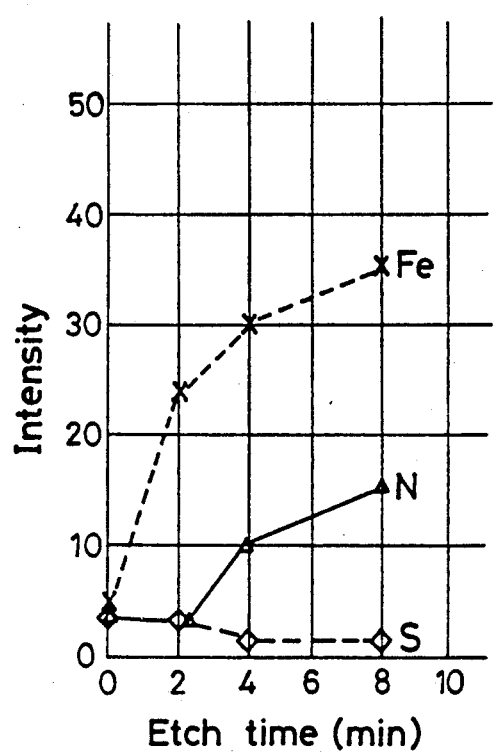
FIG. 4b is a graph showing the result of elemental analysis performed by Auger electron spectroscopy on the gas sulphonitriding surface of the member treated in Comparative Example 1.

The sulphonitrided layers in the piston members treated in Example 1 and Comparative Example 1 were analyzed for the surface composition by Auger electron spectroscopy and the results are shown in FIGS. 4a and 4b. As is clear from FIG. 4a, very few nitrogen atoms were present on the surface of the members treated in Example 1 in accordance with the method of the present invention. Instead, sulfur atoms were abundant, suggesting the formation of a sulphurized layer on the surface. On the other hand, as FIG. 4b shows, very few sulfur atoms were present on the surface of the members treated in Comparative Example 1 whereas Fe and N atoms were abundant, suggesting the formation of a nitrided layer in preference over a sulphurized layer which formed only negligibly.

Figure 5:
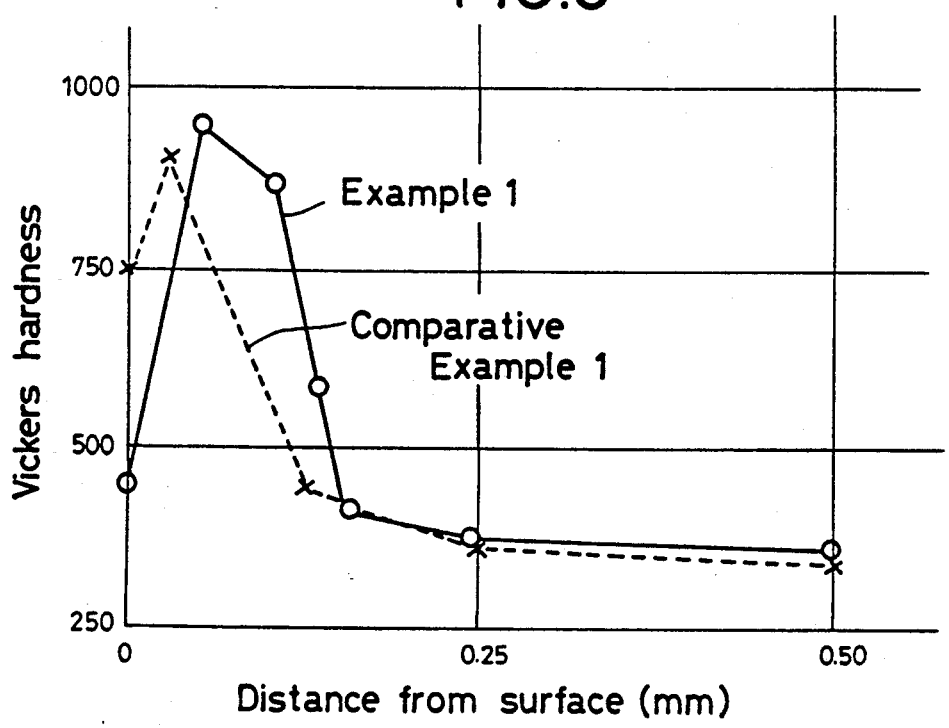
FIG. 5 is a graph showing the Vickers hardnesses of the gas sulphonitrided surfaces of the members treated in Example 1 and Comparative Example 1.

The hardness profiles in cross section of the surfaces of the sulphonitrided layers in the piston members treated in Example 1 and Comparative Example 1 were measured by Vickers hardness testing. The results are shown in FIG. 5, from which one can see that the sulphurized layer made of FeS$_2$ and FeS in the members treated in Example 1 had a Vickers hardness of ca. 400–450 whereas the nitrided layer made of α'-Fe$_4$N had been hardened to 950 on the Vickers scale, indicating that the surfaces of the treated members were thoroughly sulphonitrided. In contrast, the formation of a sulphurized layer on the surfaces of the members treated in Comparative Example 1 was negligible and the Vickers hardness of those surfaces was nearly 750 just starting at the topmost layer. The Vickers hardness of the nitrided layer was ca. 900 at maximum, which was lower than in the members treated in Example 1. One can predict from these results that the members treated in Comparative Example 1 which were substantially free from a sulphurized layer would easily undergo "galling" when put to the actual use.

EXAMPLE 2 AND COMPARATIVE EXAMPLE 2

Piston members of the same type as used in Example 1 were polished to a surface roughness of less than ca. 1 µm (Comparative Example 2) or shot peened with balls (0.5 mmφ) to a surface roughenss of 20 µm (Example 2). The thus polished or grained surfaces of the members were gas sulphonitrided as in Example 1. The treated members were subjected to a sliding test and the percentage of microdamaged area of each treated surface was measured as a function of sliding time. The results are shown in FIG. 6.

Figure 6:
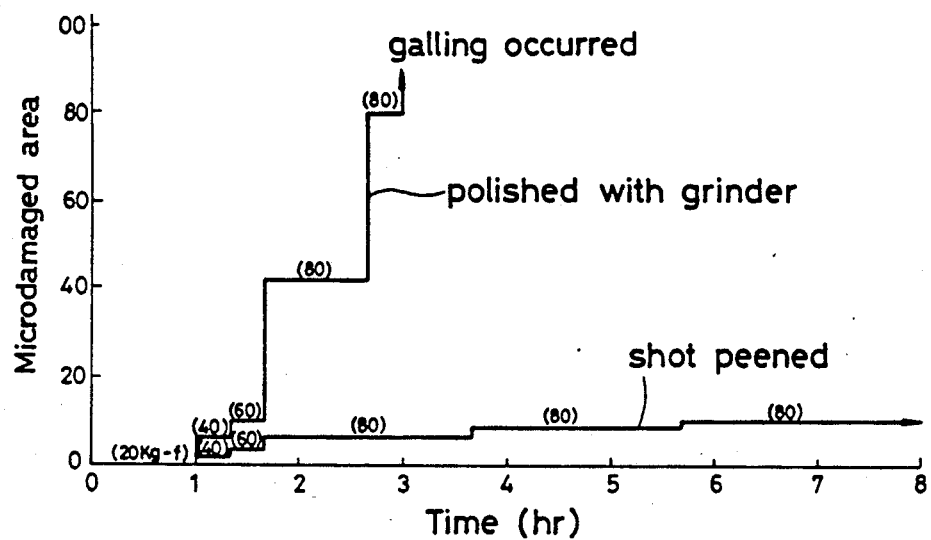
FIG. 6 is a graph showing the sliding characteristics of the members treated in Examples 3 and 4.

As is clear from FIG. 6, the microdamaged area of the members treated in Comparative Example 2 after surface polishing exceeded 40% within only two hours after the start of the sliding test and "galling" occurred in about 3 hours. In contrast, the microdamaged area of the members subjected to gas sulphonitriding in Example 2 after surface graining remained at ca. 10% even when 6 hours passed after the start of the sliding test. These results show that the gas sulphonitriding method of the present invention proves even more effective if it is performed on workpieces after their surface is grained.

EXAMPLE 3

The second gas sulphonitriding method of the present invention was implemented using an apparatus of the type shown in FIG. 2.

Figure 7:
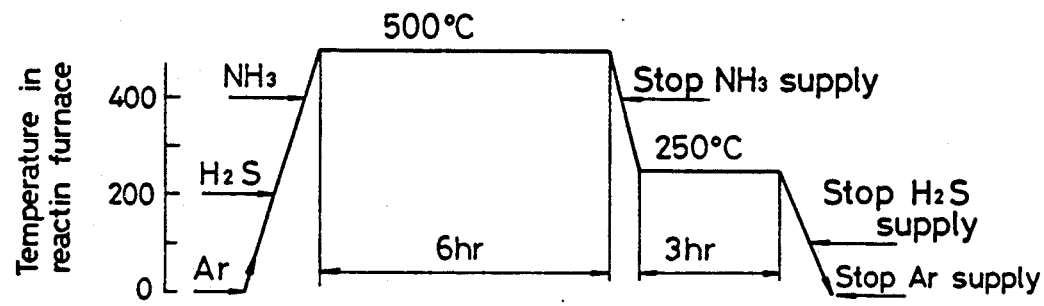
FIG. 7 is a diagram showing the heating profile adopted in implementing another version of the gas sulphonitriding method of the present invention in Example 3.

FIG. 7 is a diagram showing the heating profile adopted in implementing the method of the present invention in Example 3.

As shown in FIG. 7, the process started with a stage of heating from ambient temperature, in which an Ar gas was supplied into the reaction furnace 21 chiefly for the purpose of preventing oxidation of the hydraulic piston members in the furnace. When the temperature in the furnace 21 reached 200° C., the valve 38 was opened to supply a hydrogen sulfide (H$_2$S) gas in a predetermined volume (50 ppm). When the temperature in the reaction furnace reached 400° C., the valves 45 and 47 were opened to start supplying 20 vol % of ammonia (NH$_3$) for nitriding. Thereafter, the temperature in the reaction furnace was maintained at 500° C. for 6 hours to perform nitriding. Six hours later, the heating in the reaction furnace was ceased and it was allowed to cool slowly at a rate of 50° C./h. When the temperature decreased to 400° C., the supply of NH$_3$ gas was ceased. When the temperature further decreased down to 250° C., the concentration of hydrogen sulfide gas was increased to 150 ppm and the temperature of 300° C. was maintained for 3 hours. Thereafter, the heating in the reaction furnace was ceased. When the furnace temperature decreased to 200° C., the supply of hydrogen sulfide gas was also ceased and the reaction furnace was left to cool to ambient temperature in an Ar gas atmosphere.

After the end of the treatment, all valves were closed and the temperature in the thermostatic bath was lowered to 263K, whereby the evolution of hydrogen sulfide gas was ceased. Thereafter, the residual hydrogen sulfide and NH$_3$ gases were forced out of the reaction furnace into the cleaning unit 11. After the concentration of the residual H$_2$S gas in the reaction furnace was verified to be lower than a permissible level, the furnace was opened and the treated hydraulic piston members were recovered.

COMPARATIVE EXAMPLE 3

The procedure of Example 3 was repeated with the following modifications made: no hydrogen sulfide gas was used and only ammonia gas having a concentration of 20 vol % was supplied together with Ar gas to perform gas nitriding at 500° C. for 6 hours; thereafter, the supply of ammonia gas and the heating in the reaction furnace were ceased and the furnace was left to cool to ambient temperature in an Ar gas atmosphere.

COMPARATIVE EXAMPLE 4

The hydraulic piston members that were gas nitrided in Comparative Example 3 were polished to remove the $\epsilon$-Fe$_{2-3}$N layer from the surface. The polished members were immersed in a thiocyanate containing salt bath held at 190° C. and anodic electrolysis was conducted with the parts connected to anode and the treating vessel to cathode, whereby an iron sulfide layer was formed on the surface layer of each member. This sulphurization process is generally called the Caubet process. Sulphurization by the Caubet process is impossible without polishing the gas nitrided hydraulic piston members to remove the surface $\epsilon$-Fe$_{2-3}$N layer.

Figure 8:
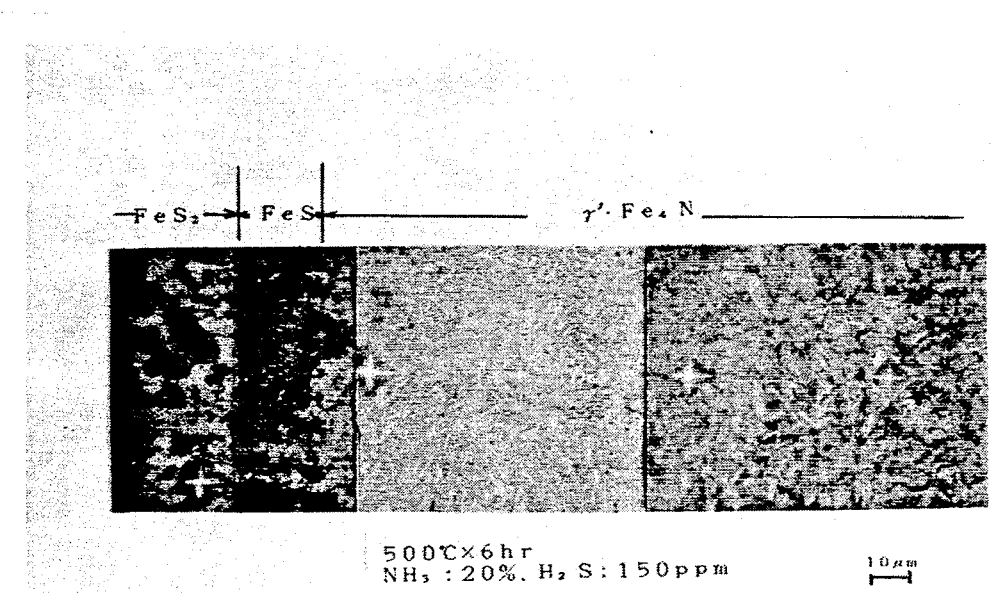
FIG. 8 is an optical micrograph showing a cross-sectional structure of the hydraulic piston member treated in Example 3.

The hydraulic piston members sulphonitrided in Example 3 were examined for their cross-sectional structure with a microscope. The results are shown in FIG. 8, from which one can see that a layer of granular FeS$_2$ crystals formed on the topmost surface of the members, a layer of "streaky" FeS crystals formed beneath, and a layer of acicular $\epsilon'$-Fe$_4$N crystals formed further beneath.

Figure 9:
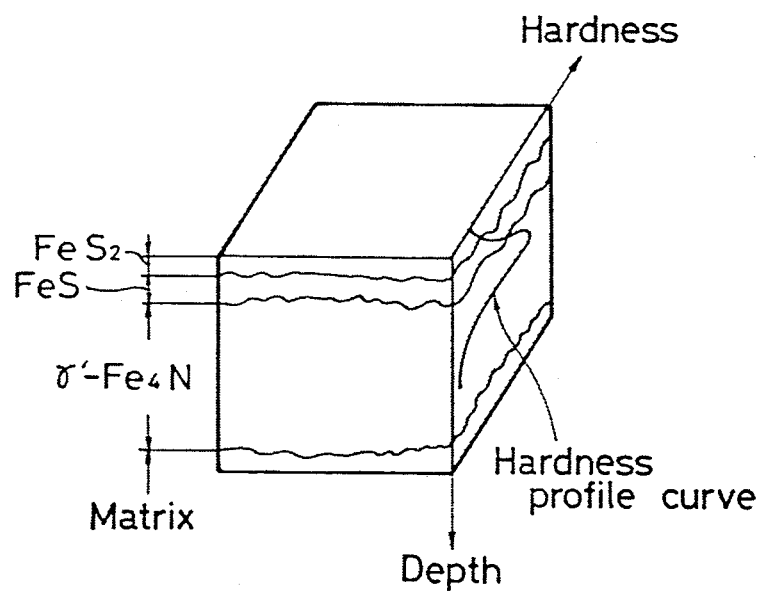
FIG. 9 is a characteristic diagram showing the hardness profile in depth direction of a cross-sectional structure of the hydraulic piston member treated in Example 3.
Figure 10A:
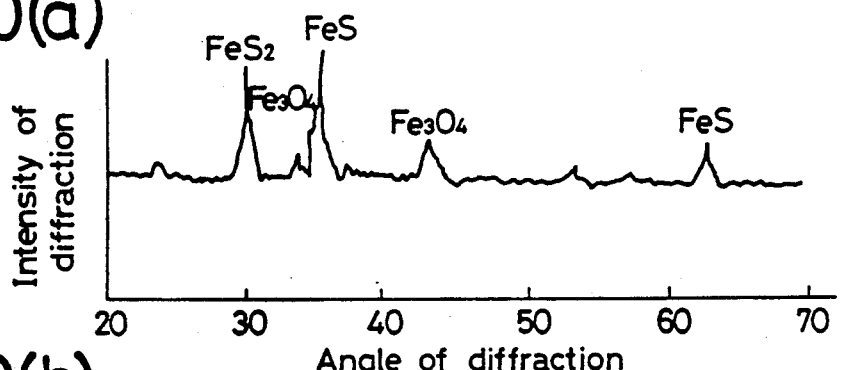
FIGS. 10a, 10b, 10c and 10d are graphs showing the results of x-ray diffraction analysis performed at successive depths cut into members as treated in Example 3.
Figure 10B:
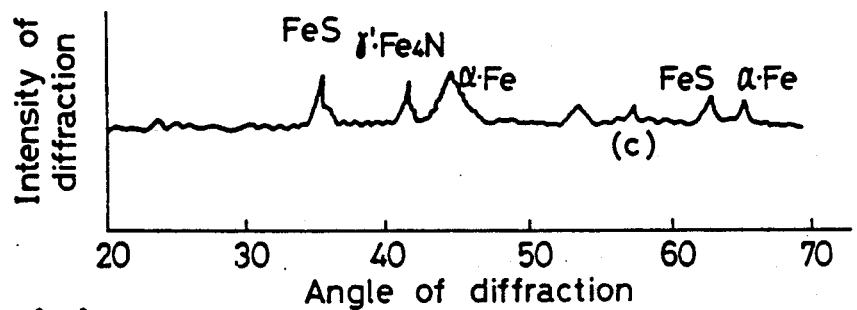
Figure 10C:
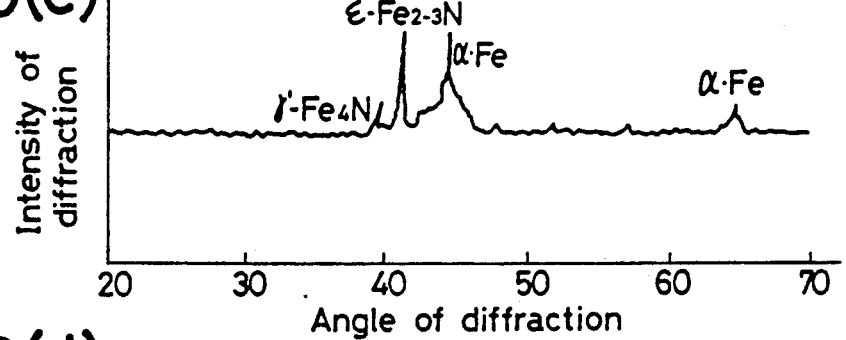
Figure 10D:
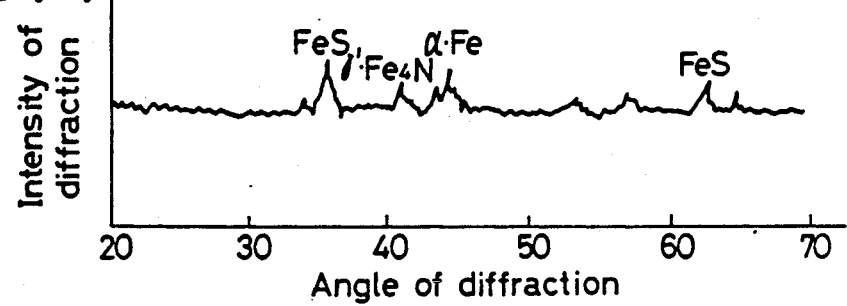

FIG. 9 is a characteristic diagram showing schematically the relationship between the cross-sectional structure of the sulphonitrided surface of the hydraulic piston members and its hardness. The topmost FeS$_2$ layer has the lowest hardness whereas the highest hardness is attained in an area slightly below the interface between the FeS layer and the $\epsilon'$-Fe$_4$N layer. The hardness sharply decreases in the deeper area.

The members treated in Example 3 were cut by successive depths into the interior and the individual cut planes were analyzed by X-ray diffraction (Cu-K$\alpha$, 40 kV, 30 mA). The results are shown in FIG. 10. FIG. 10$a$ is a diffraction scan for the first and second sulfide layers, and FIG. 10$b$ is a diffraction scan for the third layer made of a nitride. As is clear from FIG. 10$a$, a FeS$_2$ layer was present on the topmost surface of the members treated by the method of the present invention, with a FeS layer lying beneath. The scan of FIG. 10$a$ also shows diffraction lines associated with Fe$_3$O$_4$. This oxide would have derived from the water that was produced during the evolution of hydrogen sulfide. The FeS$_2$ layer had a thickness of ca. 2 $\mu$m and the underlying FeS layer was ca. 2 $\mu$m thick.

As is clear from FIG. 10$b$, a $\gamma'$-Fe$_4$N layer formed beneath the FeS layer but there was no "white layer" present. The $\gamma'$-Fe$_4$N layer was ca. 150 $\mu$m thick.

The members treated in Comparative Examples 3 and 4 were analyzed by X-ray diffraction under the same conditions as mentioned above, and the results are shown in FIGS. 10$c$ and 10$d$. As is clear from FIG. 10$c$, a white layer was present on the surface of the gas nitrided members. As is clear from FIG. 10$d$, only a FeS layer could be formed on the surface when sulphurization was performed by Caubet process. A further disadvantages of the Caubet process is the necessity of first performing gas nitriding and then polishing the surface to remove the "white layer". This involves a total of three steps and results in a very low process efficiency.

The hydraulic piston members sulphonitrided in Example 3 and those which were gas nitrided and sulphurized electrolytically by the Caubet process in Comparative Example 4 were analyzed by Auger electron spectroscopy for the compositional distributions of sulfur and nitrogen atoms. The results are shown in FIGS. 11$a$ and 11$b$.

Figure 11A:
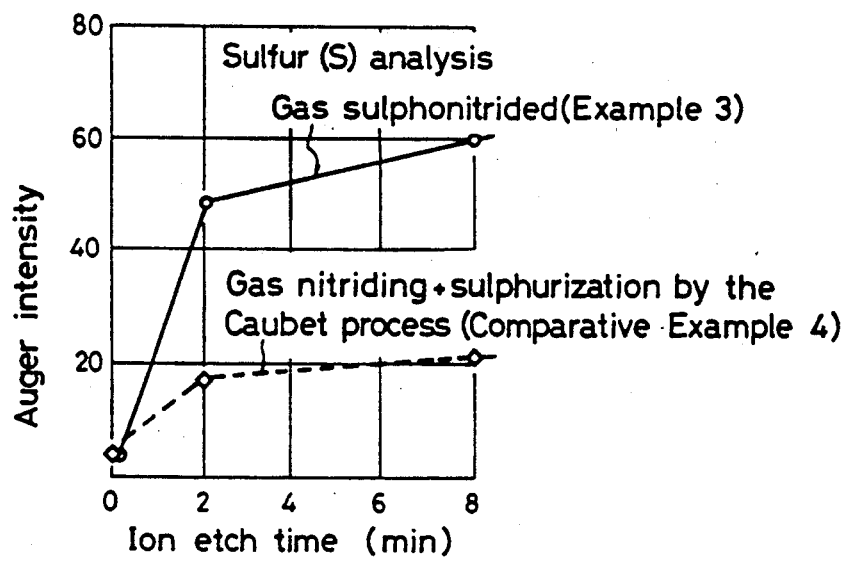
FIGS. 11a and 11b are characteristic diagrams showing the compositional distributions of sulfur and nitrogen atoms, respectively, in the surfaces of hydraulic piston members as treated in Example 3 and Comparative Example 4.
Figure 11B:
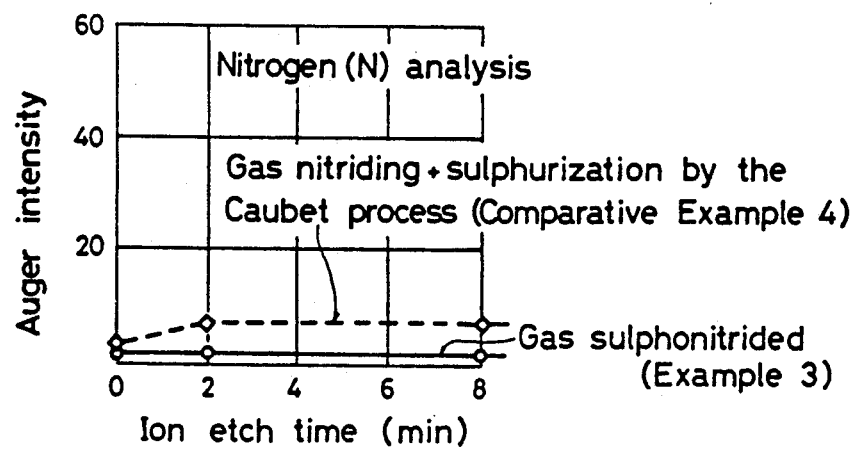

FIG. 11$a$ shows the compositional distribution of sulfur atoms; the solid line plots the results of analysis on the piston members treated in Example 3 and the dashed line plots the results for the piston members treated in Comparative Example 4. As is clear from FIG. 11$a$, an extremely large number of sulphur atoms and, hence, sulfides such as FeS$_2$ and FeS could be introduced into the surface of piston members by the sulphonitriding method of the present invention. On the other hand, only a small number of sulfur atoms could be introduced by the Caubet process; namely, no FeS$_2$ layer could be formed on the surface of piston members by the Caubet process.

FIG. 11$b$ shows the compositional distribution of nitrogen atoms; the solid line plots the results of analysis on the piston members treated in Example 3 and the dashed line plots the results for the piston members treated in Comparative Example 4. As is clear from FIG. 11$b$, very few nitrogen atoms were present on the surface of the piston members treated by the sulphonitriding method of the present invention. On the other hand, a fairly large number of nitrogen atoms were present on the surface of the piston members treated by the Caubet process. This fact would suggest that the extremely thin FeS layer formed by the Caubet process is partially interspersed with a nitride.

EXAMPLE 4

Hydraulic piston members were sulphonitrided under identical conditions to those employed in Example 3, except that the period of gas nitriding at 500° C. was shortened from 6 to 3 hours.

Figure 12:
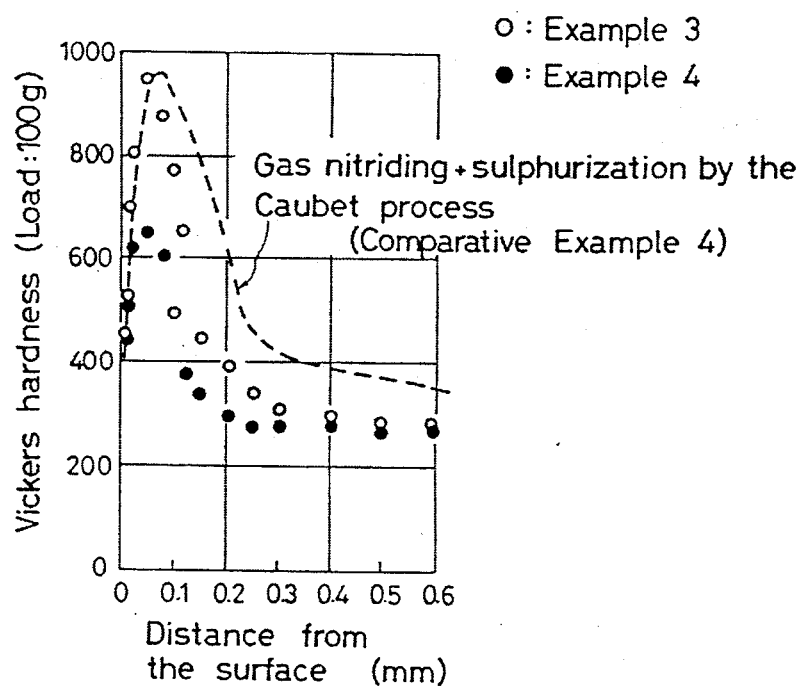
FIG. 12 is a characteristic diagram showing the results of depth analysis for Vickers hardness profile in the hydraulic piston members treated in Examples 3 and 4 and in Comparative Example 4.

The samples obtained in Examples 3 and 4 and Comparative Example 4 were subjected to a Vickers hardness test and the results are shown in FIG. 12, in which the dashed line refers to the samples of Comparative Example 4, the unfilled circles (○) refer to the samples of Example 3, and the filled circles (●) refer to the samples of Example 4.

As is clear from FIG. 12, the samples of Example 3 which were treated by gas nitriding at 500° C. for 6 hours and then gas sulphurized at 250° C. had hardness values that were substantially comparable to those of the samples that were first gas nitrided, then sulphurized by the Caubet process in the conventional manner. The samples of Example 4 which were treated by gas nitriding at 500° C. for 3 hours also had commercially acceptable values of Vickers hardness.

COMPARATIVE EXAMPLE 5

Hydraulic piston members were gas sulphonitrided under identical conditions to those employed in Example 3, except that gas nitriding (the primary heat treatment) was performed for 6 hours at 560° C. instead of 500° C.

COMPARATIVE EXAMPLE 6

Hydraulic piston members were gas sulphonitrided under identical conditions to those employed in Comparative Example 5, except that the period of gas nitriding at 560° C. was shortened to 3 hours.

Figure 13:
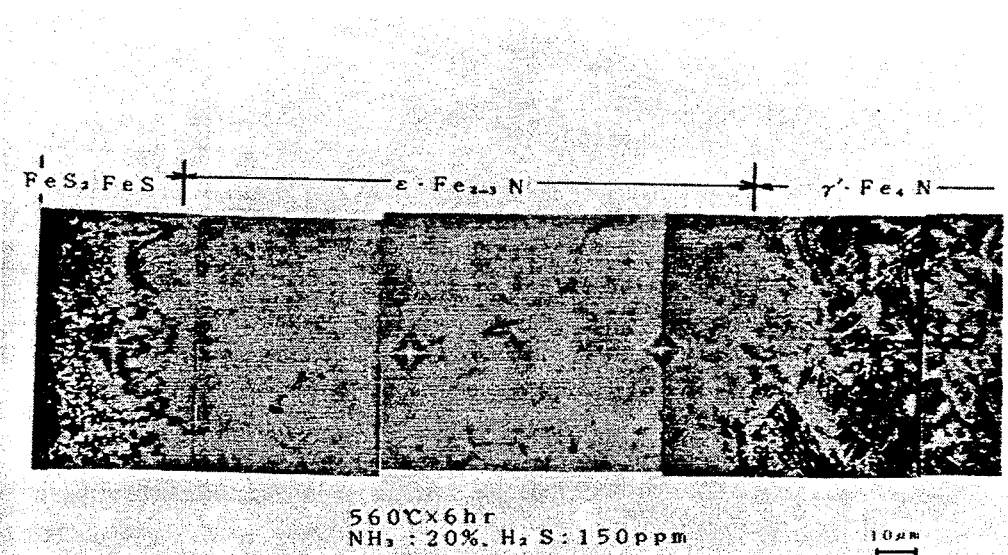
FIG. 13 is an optical micrograph showing a cross-sectional structure of the hydraulic piston member treated in Comparative Example 5.

The piston members treated in Comparative Example 5 were examined for their cross-sectional structure with an optical microscope and the result is shown in the micrograph of FIG. 13. When gas nitriding was performed at 560° C. for 6 hours, a $FeS_2$ layer formed on the topmost surface of each piston member; at the same time, a white $\epsilon$-$Fe_{2-3}N$ layer also formed between the underlying FeS and $\gamma'$-$Fe_4N$ layers.

Figure 14:
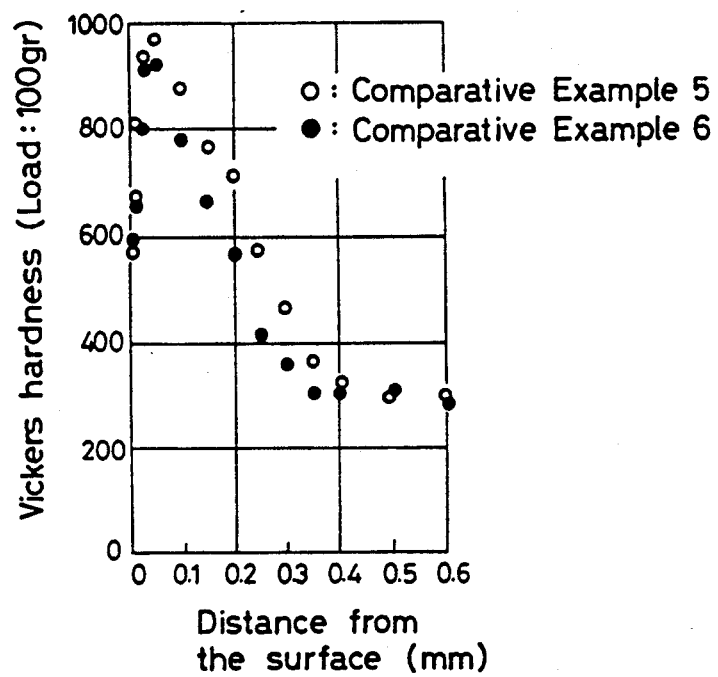
FIG. 14 is a characteristic diagram showing the results of depth analysis for Vickers hardness profile in the hydraulic piston members treated in Comparative Examples 5 and 6.

The samples of Comparative Examples 5 and 6 were subjected to a Vickers hardness test and the results are shown in FIG. 14, wherein unfilled circles (○) refer to the samples of Comparative Example 5 and filled circles (●) refer to the samples of Comparative Example 6.

As is clear from FIG. 14, the samples treated by gas nitriding at 560° C. had a "white layer" formed in the vicinity of the surface, so the hardness of the topmost surface was unduly high. In fact, as is clear from comparison with the hardness curves shown in FIG. 12 for the case of gas nitriding at 500° C., the initial hardness of the samples increased by a factor of ca. 1.5.

As discussed on the foregoing pages, the gas sulphonitriding methods of the present invention are in sharp contrast with the prior art in that they are capable of forming a $FeS_2$ layer on the topmost surface of a steel sliding member. If desired, a FeS layer and a $\gamma'$-$Fe_4N$ layer can be formed, in that order, beneath the $FeS_2$ layer.

The layer of FeS crystals forms streaks whereas the layer of $FeS_2$ crystals consists of grains. Therefore, $FeS_2$ has a weaker binding force and provides a better "fit" between mating parts. Further, $FeS_2$ is capable of retaining twice or three times as much lubricant as can be held by FeS. Hence, in the presence of a $FeS_2$ layer on the topmost surface of a sliding member, it can be brought into engagement with the mating part very smoothly without causing any damage.

The sliding member of the present invention has on its topmost surface a $FeS_2$ layer that has a good "fit" and a high capability of retaining lubricants. Below the $FeS_2$ layer is a FeS layer that will readily deform under shear stress. Situated next below is a highly wear-resistant iron nitride ($\gamma'$-$Fe_4N$) layer. With this arrangement, the destruction of lubricant films due to tiny asperities that are created due to working tolerances and/or working processes, in particular, the occurrence of undesired phenomena such as "galling" or seizure due to contact between projections can be significantly reduced by the inherent nature of the $FeS_2$ layer and the underlying FeS layer. These two layers combine together to provide a synergistic lubricanting action that imparts an adequate "fit" to frictional surfaces, whereby excellent tribological characteristics are insured for sliding members of interest.

Further, the method of the present invention permits a sulphurizing gas and a nitriding gas to be supplied, either in admixture or individually, into the reaction surface and, hence, sliding members can be treated to have layers having desired compositions.

What is claimed is:

1. A sliding member comprising Fe as a matrix and comprising:
   an $FeS_2$ layer on the topmost surface of the sliding member,
   an FeS layer below the $FeS_2$ layer, and
   a $\gamma'$-$Fe_4N$ layer below the FeS layer, wherein said $FeS_2$ layer, FeS layer and $\gamma'$-$Fe_4N$ layer are formed by a gas sulphonitriding method.

2. A sliding member according to claim 1, wherein the sliding member is made of steel.

3. A sliding member comprising Fe as a matrix and comprising:
   an $FeS_2$ layer on the topmost surface of the sliding member,
   an FeS layer below the $FeS_2$ layer, and
   a $\gamma'$-$Fe_4N$ layer below the FeS layer.

4. A sliding member according to claim 3, wherein the sliding member is made of steel.

* * * * *